April 28, 1931. W. C. HENDERSON 1,802,814
MACHINE FOR MAKING COMPRESSES
Filed Nov. 7, 1928   4 Sheets-Sheet 2

INVENTOR
Walter C. Henderson
By Brown & Critchlow
his Attorneys

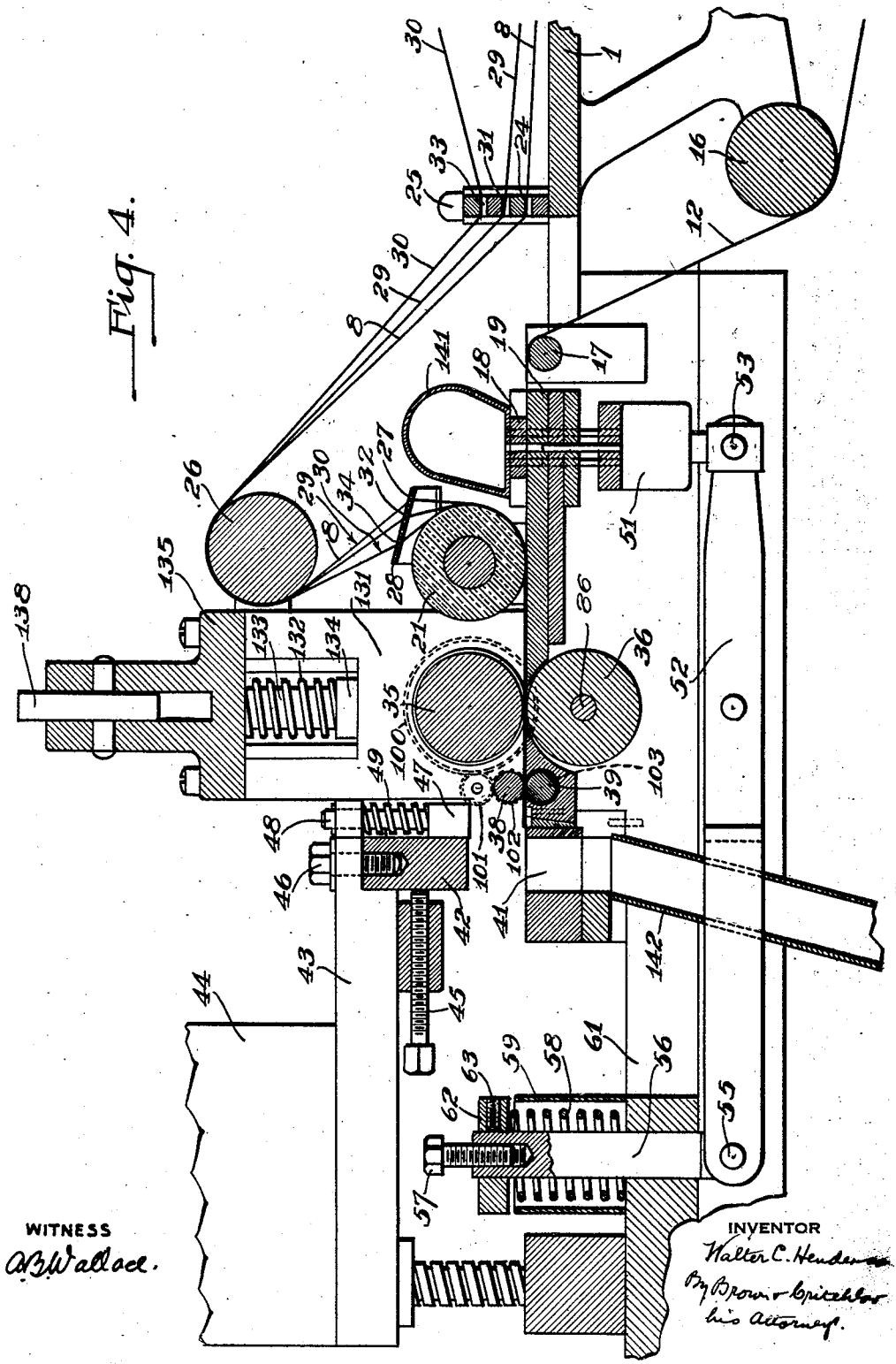

Patented Apr. 28, 1931

1,802,814

UNITED STATES PATENT OFFICE

WALTER C. HENDERSON, OF PITTSBURGH, PENNSYLVANIA, ASSIGNOR TO MINE SAFETY APPLIANCES COMPANY, OF PITTSBURGH, PENNSYLVANIA, A CORPORATION OF PENNSYLVANIA

MACHINE FOR MAKING COMPRESSES

Application filed November 7, 1928. Serial No. 317,344.

The invention relates to a machine for manufacturing surgical compresses, especially an adhesive type which comprises a pad of absorbent material mounted upon a strip of adhesive tape and having a protective covering of shield cloth overlying the exposed surfaces of both the adhesive tape and the absorbent material.

The object of the invention is to provide a machine for automatically manufacturing uniformly shaped adhesive compresses of the above described character at a relatively high speed and at a low cost.

More especially it is an object of the invention to provide a compress manufacturing machine for automatically assembling continuous strips of medically treated absorbent compress material, adhesive tape, and shield cloth, and for cutting the assembled strips into compresses of a predetermined length.

Figure 1:
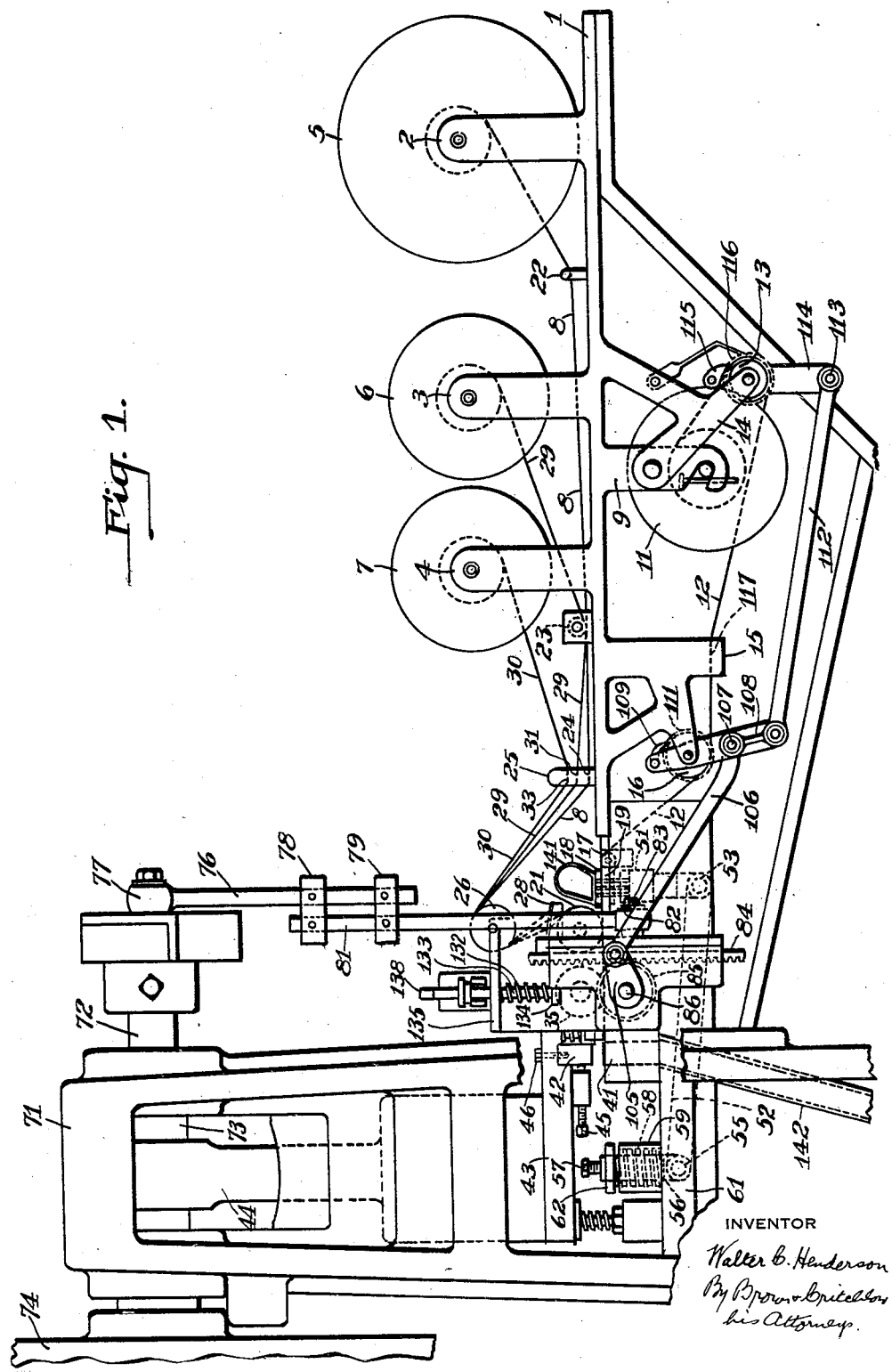
Figure 2:
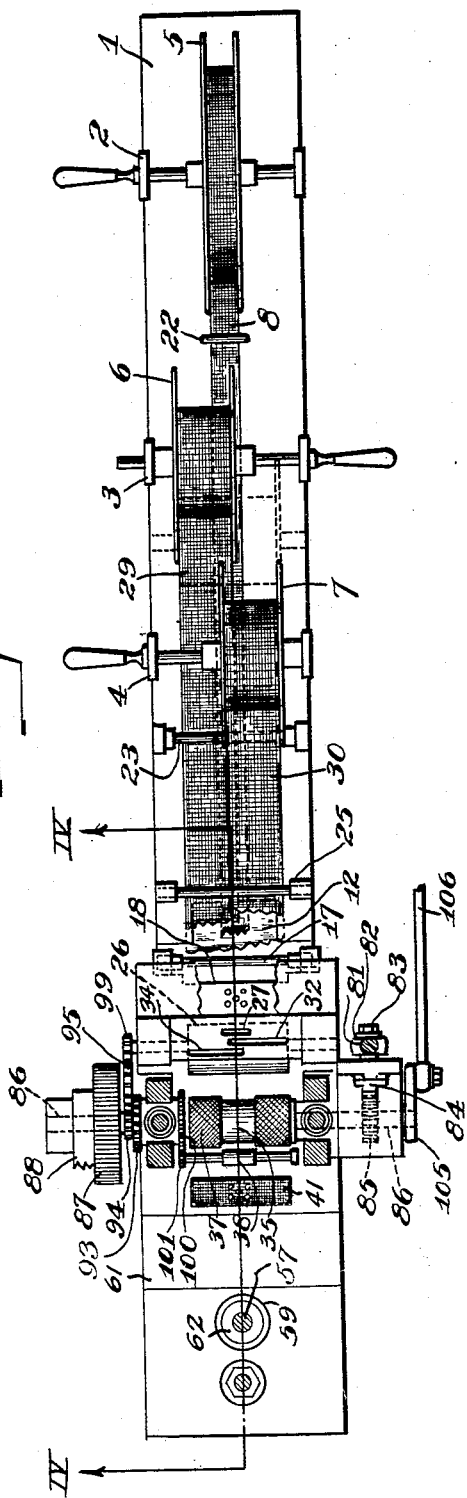
Figure 3:
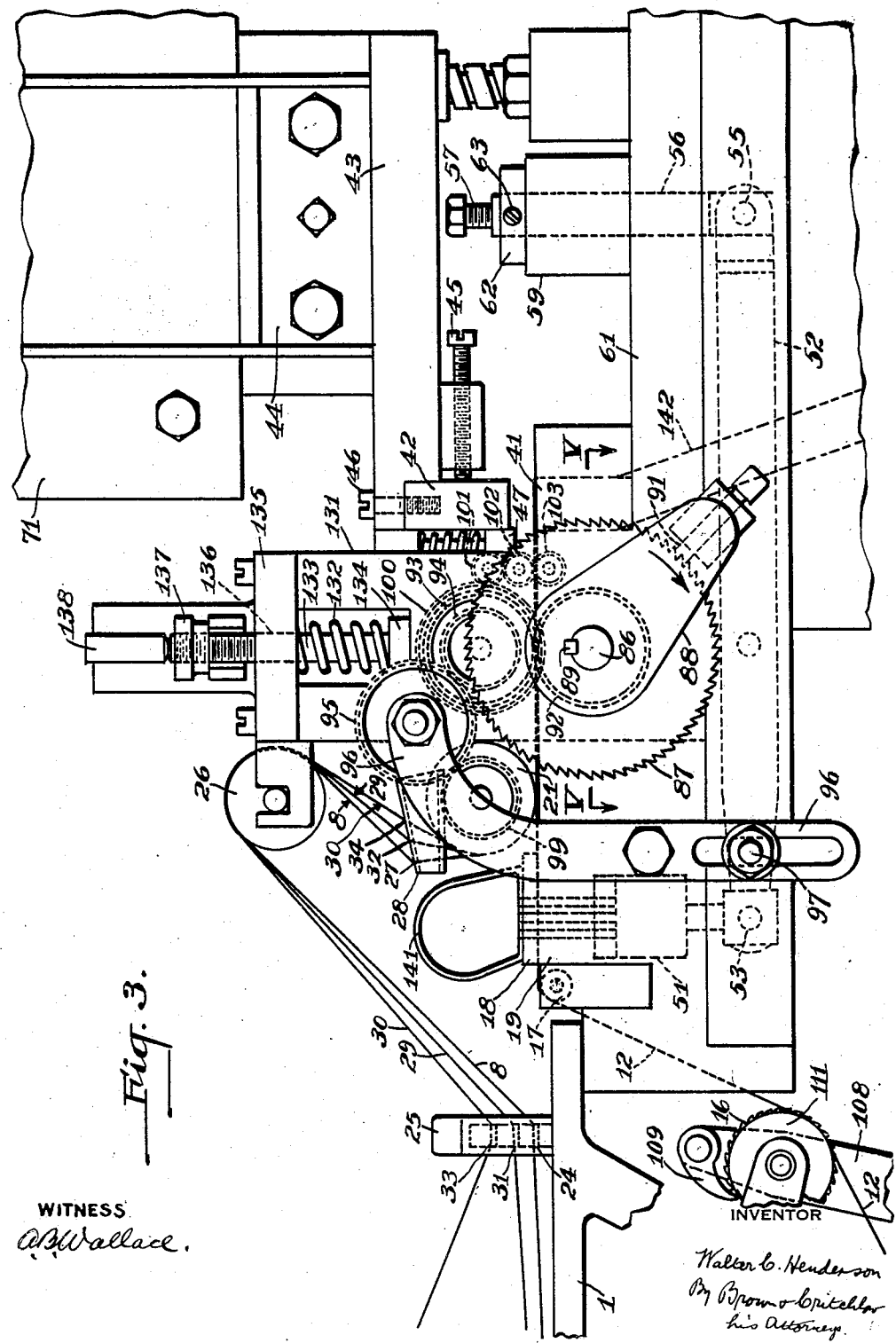

Other objects will become apparent and a better understanding of the invention will be had when the following detailed description is read in conjunction with the accompanying drawings, in which Fig. 1 is a view in side elevation of a machine embodying the preferred form of the invention; Fig. 2 a top plan view of the machine with a portion of the upper structure cut away; Fig. 3 an elevation to enlarged scale of the machine as viewed from the side opposite to that shown in Fig. 1; Fig. 4 a sectional view taken on the line IV—IV, Fig. 2; Fig. 5 a horizontal sectional view through the machine on the line V—V, Fig. 3; and Fig. 6 an end view of a detail of construction presently to be explained.

In the machine provided according to this invention, continuous strips of adhesive tape, absorbent material and shield cloth are drawn from suitable supplies thereof, and, after being placed in their proper relative positions, are pressed together to form a continuous strip of compresses which is severed into individual compresses. Preferably, a reel of adhesive tape is mounted below a table forming a part of the machine frame, and reels of absorbent material and shield cloth are mounted above the table, the absorbent material and shield cloth being applied to the exposed adherent surface of the tape while the several strips are drawn from their reels. Provision is preferably made for perforating the adhesive tape so that the compresses may be properly ventilated, this being done prior to the pressing of the absorbent material and shield cloth upon the tape.

While these operations may be variously performed, they are preferably done intermittently and in alternation, equal lengths of the several strips being intermittently withdrawn from their several reels, and the tape being punched and the assembled strips cut during the intervals between the withdrawal of the strips from their reels.

Having reference to the illustrative embodiment of the invention, the top of a frame or table 1 is provided with brackets 2, 3 and 4 in which reels 5, 6 and 7, respectively, are rotatably and removably mounted. Upon reel 5, which is mounted in the outer central portion of bracket 2, there is wound a continuous strip 8 of absorbent material, and upon reels 6 and 7, which are arranged in staggered relation on opposite sides of the center of the table, there are wound continuous strips of shield cloth, such as muslin or crinoline gauze, used to cover and protect the compress. A bracket 9 is provided below the top of table 1, and in it there is removably mounted a reel 11 carrying a continuous strip 12 of adhesive tape. In withdrawing tape 12 for its assembly with the several strips, it is passed over a roll 13 mounted in a bracket 14, and from thence it is carried forward over a support 15, a roll 16, upwardly to the level of the table top and over an idler roll 17. From idler roll 17 it is passed forwardly between a pair of die plates 18 and 19 (Fig. 4), thence along the table and under an assembly roll 21 which is preferably faced with a suitable yieldable cover, such as rubber.

To position absorbent strip 8 in the center of tape 12 as the former is unwound from reel 5, it is passed successively under idler rolls 22 and 23, through a slot 24 in a guide frame 25 (Fig. 4), over an idler roll 26, downwardly through a slot 27 in the center of a guide plate 28, and around and under assembly roll 21 onto the center of the adhesive side of tape 12 disposed thereunder. That shield cloth strips 29 and 30 wound upon reels 6 and 7 may be assembled upon the adhesive tape with each covering the exposed adhering surface of the tape on one side of the strip of absorbent material, and with their inner edges overlapping each other on the absorbent material, strip 29 is passed under idler roll 23, through a slot 31 provided in guide frame 25, over idler roll 26, downwardly through a slot 32 in guide plate 28, and then around and under assembly roll 21 onto the adhesive tape, and strip 30 is passed from roll 7 through a slot 33 in the upper end of guide member 25, over idler roll 26, down through a guide slot 34 in guide plate 28, and around assembly roll 21 and onto the adhesive tape. Thus the absorbent material and strips of shield cloth are effectively mounted upon the adhesive tape, but it will be understood that they may be guided and assembled in other ways.

After the strips and tape are assembled beneath roll 21, they pass under, and are pressed together by, a pair of driven drag rolls 35 and 36 provided at their opposite ends with knurled portions 37, the space between the knurling being sufficient to receive the strip of absorbent material at the center of the adhesive tape. Upon leaving drag rolls 35 and 36, the assembled strip is passed through a pair of pinch rolls 38 and 39 which maintain it in alignment as it leaves the drag rolls, and beyond these rolls the strip passes over a shear opening 41 provided in the frame of the machine.

Above opening 41 a shear 42 is adjustably attached by screws 45 and 46 to a face plate 43 connected to the bottom of a reciprocating member 44. Shear 42 is adapted to pass down into opening 41 on each down stroke of member 44, and thereby sever the strip extending beyond pinch rolls 38 and 39. To prevent the assembled strip from being pulled out of shape when the shearing operation takes place a pinch block 47 is mounted upon a shaft 48 slidably carried in plate 43, and for urging this block downwardly a helical spring 49 is interposed between it and plate 43. Normally, block 47 projects slightly below shear 42, as shown in Fig. 4, and accordingly engages the assembled strip before it is engaged by shear 42, thereby preventing the strip from getting out of alignment during each shearing operation.

In order to provide the adhesive tape with ventilating perforations, a punch 51 is suitably mounted in the frame in alignment with die plates 18 and 19. For actuating the punch, one end of a pivotally mounted rocker arm 52 is pivotally connected at 53 to the lower end of the punch, and its other end is pivotally connected at 55 to the lower end of a rod 56 which extends upwardly through the frame for enegagement by reciprocating member 44 upon each of its downward strokes. An adjusting screw 57 is threaded in the upper end of rod 56 for engagement by face plate 43 to move arm 52 to force punch 51 upwardly through die plates 18 and 19 and through the adhesive tape. By means of a spring 58 surrounding rod 56 and enclosed in a casing 59, rocker arm 52 is normally urged to maintain punch 51 in its lower position below die plates 18 and 19, the lower end of spring 58 resting upon a portion 61 of the machine frame, and its upper end engaging a disk 62 attached by a set screw 63 to rod 56. It will be readily seen that by having the shear and punch actuated in the manner described that the punching and shearing operations take place simultaneously on the down stroke of member 44.

While the moving or driven elements of the machine may be actuated in various ways, in the present machine gear wheels are used for transmitting the driving power, a reciprocatory type of driving mechanism being employed. Although any suitable type of reciprocatory driving device may be utilized, a punch press or stamping mill type of machine is here illustrated for actuatng the gear wheels, shear and punch. This machine comprises a frame 71 (Fig. 1), a rototable shaft 72 provided with an eccentric or a crank 73, a power driven wheel 74 mounted on one end of shaft 72, a reciprocating element 44 attached to and operated by crank 73, and a drive rod 76 connected by means of an adjustable eccentric attachment 77 (Fig. 6) to the end of shaft 72. Drive rod 76 is in turn connected through adjustable connecting links 78 and 79 to an extension 81 for transmitting power to the assembly mechanism of the machine. The lower end of extension 81 is pivotally connected at 82 to an arm 83 extending laterally from a rack 84 which meshes with a gear wheel 85 connected to one end of a shaft 86 passing through the center of the lower drag roll 36, and upon which the drag roll is loosely mounted. Surrounding the other end of shaft 86 a ratchet wheel 87 is rigidly secured to drag roll 36, the ratchet wheel being driven by an arm 88 attached to shaft 86 by a key 89, and provided at its outer end with a pawl 91 which engages the teeth of wheel 87 when the arm is actuated in a clockwise direction as viewed in Fig. 3.

Between wheel 87 and drag roll 36, and rigidly affixed to the latter, is a gear wheel 92 which meshes with a gear wheel 93 rigidly attached to drag roll 35 for rotating the latter. Attached to roll 35 is a gear wheel 94 meshing with an idler gear wheel 95 supported in a bracket 96 adjustably attached by means of a screw bolt 97 to the frame of the machine. Idler 95 meshes also with a gear wheel 99 rigidly attached to assembly roll 21 for rotating it. Adjacent to gear wheels 93 and 94 and connected rigidly therewith is another gear wheel 100 which meshes with a gear wheel 101 meshing with a gear wheel 102 connected to pinch roll 38 for rotating the pinch rolls, pinch roll 39 having a gear wheel 103 connected to it which meshes with gear wheel 102. By arranging the ratchet and gear wheels in the manner described, with every downward movement of rack 84 the drag rolls 35 and 36 and pinch rolls 38 and 39 are operated in synchronism to cause the various strips of material and the assembled strip to be moved at the same speed.

Rolls 13 and 16 are preferably driven to assist in unreeling the adhesive tape so that it will not be unduly stretched. For this purpose an arm 105 (Fig. 1) is rigidly secured to the end of shaft 86 adjacent to gear wheel 85, and a rod 106 connects the outer end of this arm to a rocker arm 108 pivotally mounted on the shaft of roll 16. On the upper end of this rocker arm there is provided a pawl 109 adapted to engage teeth on the periphery of a ratchet wheel 111 rigidly secured to roll 16, whereby the upward movement of rack 84 and the consequent upward movement of drive arm 105 causes the lower end of rocker arm 108 to move in the direction of the line of travel of tape 12 and thereby causes roll 16 to rotate in a direction to pull or advance the tape. Between the lower end of rocker arm 108 and a second rocker arm 114 pivotally mounted on the shaft of roll 13, a second drive rod 112 is pivotally connected. Pivotally mounted on the upper end of arm 114 there is a pawl 115 adapted to engage teeth on the periphery of a ratchet wheel 116 rigidly attached to roll 13. Consequently, with the movements of arms 105 and 108, arm 114 is also rocked to cause roll 13 to be actuated at the same speed and in the same direction as roll 16 to pull the adhesive tape from the reel 11. To facilitate the movement of the adhesive tape over table 1, it is passed over a block of paraffine 117, or other lubricant, attached to support 15.

To apply variable but adequate pressure between drag rolls 35 and 36, the upper roll is mounted in a movable bearing 131 urged downwardly by a spring 132 to force it against the lower roll 36. This spring surrounds a shaft 133, with one end engaging a block 134 (Fig. 3) provided on the lower end of shaft 133, and its other end engaging a removable plate 135 provided with an opening 136 through which rod 133 passes. The upper end of rod 133 is threaded for the reception of an adjusting nut 137 which regulates the pressure of spring 132 against bearing 131. To lock nut 137 in place, an eccentric type of locking cam 138 is provided, preferably in the form of a lever urged into locking engagement with the nut by rotating it about its pivot.

To prevent the pieces of adhesive tape removed by punch 51 from falling upon the tape as the strips are assembled, a shield 141 is mounted above die plate 18 and is provided at its ends with openings for an operator to readily remove the punchings. For carrying the assembled compresses away from the machine after they have been severed by shear 42, a chute 142 is attached to the lower end of opening 41, through which the compresses are carried to any suitable receptacle.

In the operation of the machine, a reel 5, wound with a continuous strip of absorbent material 8, is mounted in bracket 2, and reels 6 and 7, wound with continuous strips of shield cloth 29 and 30, are mounted in brackets 4 and 5, all of which brackets extend upwardly from the top of table 1. These strips are threaded through and around the several guides and rollers as shown in Fig. 1, and are finally passed between drag rolls 35 and 36. On bracket 9 extending below table 1 there is removably mounted a reel 11 on which there is wound a continuous strip of adhesive tape 12 which is threaded around and through the several rollers and guides shown in Fig. 1 until it is engaged by these drag rolls. Beneath assembly roll 21 the strip of absorbent material 8 is pressed upon the center of the exposed adhesive side of tape 12, and guard strips 29 and 30 are pressed upon the edges of the tape with their adjacent edges overlapping and protecting the absorbent material.

The movements of the several driven parts of the machine are intermittent, being effected by and in coordination with the reciprocation of member 44 (Fig. 1). The driving connections are such that upon the upward stroke of this member the drag and other driven rolls are rotated equal peripheral amounts to withdraw equal lengths of the several strips upon the table beneath assembly roll 21. On the downward stroke of member 44, punch 51 is moved upwardly to perforate tape 12 while it is at rest, and shear 40 is simultaneously moved downwardly to sever the assembled strips into individual compresses.

According to the provisions of the patent statutes, I have explained the principle and operation of my invention, and have illustrated and described what I now consider to represent its best embodiment. However, I desire to have it understood that, within the scope of the appended claims, the invention may be practiced otherwise than as illustrated and described.

I claim:

1. A machine for making adhesive compresses, comprising means for supplying continuous strips of adhesive tape, absorbent material and shield cloth, means for assembling both the absorbent material and shield cloth in strip form upon the adhesive tape, and means for cutting the assembled strip into predetermined lengths to form compresses.

2. A machine for making adhesive compresses, comprising means for supplying continuous strips of adhesive tape, absorbent material and shield cloth, said absorbent material being narrower in width than the tape, means for positioning the absorbent material in the center of the adhesive tape and covering it and the exposed adhering surface of the tape with the shield cloth, means for perforating the portion of the tape covered by the absorbent material before the absorbent material is placed thereon, and means for cutting the assembled strip into predetermined lengths to form compresses.

3. A machine for making adhesive compresses, comprising means for supplying continuous strips of adhesive tape, absorbent material and shield cloth, said absorbent material being narrower in width than said tape, means for placing the absorbent material in the center of the tape, means for placing a strip of shield cloth on the exposed adhering surface of the tape on each side of the absorbent material, the inner edges of said strip of shield cloth being overlapped in the center of the strip, means for pressing the strip together, means for cutting perforations in the portion of the adhesive tape covered by the absorbent material before said material is placed on the tape, and means for cutting the assembled strip into predetermined lengths.

4. A machine for making adhesive compresses, comprising means for supplying a continuous strip of adhesive tape, means for supplying a continuous strip of absorbent material narrower in width than the adhesive tape, means for supplying two strips of shield cloth, all adapted to be passed progressively through the machine, means for assembling them so that the absorbent material is positioned in the center of the tape and the shield cloth covers the exposed edges of the adhesive tape and the absorbent material in the center of the tape, the two free ends of the strips of shield cloth overlapping each other in the center of the strip, means for making at spaced intervals perforations in the portion of the adhesive tape to be covered by the absorbent material before said material is attached to it, means for pressing the strips of absorbent material and shield cloth upon the adhesive tape, and means for cutting the assembled strip into predetermined lengths to form the compresses, the length of each being such that the spaced perforations in the adhesive tape are disposed in the center of each compress.

5. A machine for making adhesive compresses, comprising a frame including a table, reels carrying continuous strips of absorbent material and shield cloth mounted above the table, a reel carrying a continuous strip of adhesive tape mounted below the table, means for assembling the various materials with the absorbent material positioned in the center of the adhesive tape and the shield cloth covering both the absorbent material and the exposed surface of the adhesive tape, means for punching holes at spaced intervals in the center of the adhesive tape before the other material is assembled thereon, and means for cutting the assembled strip into compresses of a predetermined length.

6. A machine for making adhesive compresses, comprising a supporting frame having means mounted thereon for supplying continuous strips of absorbent material, shield material and adhesive tape, means for assembling said strips together with the absorbent material in strip form in the center of the adhesive tape and the shield cloth in strip form covering both the exposed surface of the adhesive tape and the absorbent material, power operable reciprocating means for intermittently assembling and moving said materials through the machine, and means operable during the intermissions between the movement of said materials for severing the assembled strip.

7. A machine for making adhesive compresses comprising a supporting frame upon which are mounted means for continuously supplying strips of absorbent material, shield cloth and adhesive tape, means for assembling said strips together with the absorbent material in the center of the tape and the shield material covering both the adhesive tape and absorbent material, power operable reciprocating means for intermittently assembling and moving said materials through the machine, means operable during the intermissions between the movement of the material for punching holes in the center of the adhesive tape before the strips are assembled thereon, and means operable simultaneously with the punching means for severing the assembled strip.

8. A machine for making adhesive compresses comprising a frame, a plurality of reels rotatably supported in said frame, said reels having continuous strips of absorbent material, shield material and adhesive tape respectively wound thereon, means for assembling said strips with the absorbent material disposed in the center of the adhesive tape and the shield material covering both the absorbent material and the exposed surface of the adhesive tape, pawl and ratchet mechanism for intermittently actuating said assembly means, and means operable in alternation with said pawl and ratchet mechanism for cutting the assembled strip into compresses and for punching the tape prior to its assembly with the other strip.

9. A machine for making adhesive compresses, comprising means for supplying strips of adhesive tape, absorbent material and shield cloth, said absorbent material being narrower in width than the tape, means for positioning the absorbent material in strip form in the center of the adhesive tape and for placing the shield cloth over the absorbent material and the exposed adhering surface of the tape at the sides thereof, and means for pressing the strip of absorbent material and the shield cloth in place on the strip of adhesive tape.

10. A machine for making adhesive compresses, comprising means for supplying in superposed relationship a strip of adhesive tape, a strip of absorbent material and two strips of shield cloth, said strip of absorbent material being narrower in width than the strip of adhesive tape, means for positioning the strip of absorbent material in the center of the adhesive tape and for positioning one of the strips of shield cloth on the exposed adhering surface of the tape at each side of the absorbent material with their inner edges overlapping each other above the strip of absorbent material, means for pressing the strips of material together to cause the absorbent material and the outer edges of the shield strips to adhere to the tape, and means for cutting the assembled strip in predetermined lengths.

In testimony whereof, I sign my name.

WALTER C. HENDERSON.